United States Patent [19]

Hirami et al.

[11] 4,385,170
[45] May 24, 1983

[54] MELT-PROCESSABLE COPOLYAMIDES HAVING AROMATIC AMIDE UNIT AND FIBERS PREPARED THEREFROM

[75] Inventors: Matsuo Hirami, Yawata; Kazushige Kudo, Joyo; Tsutomu Sugie, Nara; Toshihide Hibino, Uji; Ryoichi Tsurutani, Uji; Shigemitsu Murase, Uji, all of Japan

[73] Assignee: Unitika Ltd., Amagasaki, Japan

[21] Appl. No.: 268,516

[22] Filed: May 29, 1981

[30] Foreign Application Priority Data

May 30, 1980 [JP] Japan ................................ 55-73624

[51] Int. Cl.$^3$ ............................................. C08G 69/32
[52] U.S. Cl. .................................... 528/338; 528/183; 528/229; 528/336; 528/337; 528/339; 528/340; 528/347
[58] Field of Search ............... 528/338, 183, 346, 347, 528/337, 339, 229

[56] References Cited

U.S. PATENT DOCUMENTS

| | | | |
|---|---|---|---|
| 3,376,270 | 4/1968 | Ridgway | 528/338 |
| 3,426,001 | 2/1969 | Ridgway | 528/338 |
| 3,597,400 | 8/1971 | Kashiro et al. | 528/338 |
| 3,645,983 | 2/1972 | Ridgway | 528/338 |

FOREIGN PATENT DOCUMENTS 889144 2/1962 United Kingdom .

OTHER PUBLICATIONS

Man-made Fibers, Science and Technology, vol. 2, pp. 316-317.

*Primary Examiner*—Harold D. Anderson
*Attorney, Agent, or Firm*—Sughrue, Mion, Zinn, Macpeak and Seas

[57] ABSTRACT

A melt-processable copolyamide prepared from diamines and dicarboxylic acids by a melt-polymerization process, wherein said copolyamide contains from about 1 to 20 mol % of an aromatic amide unit having the formula

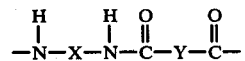

wherein X and Y are aromatic units with extended bonds, such as 1,4-phenylene group. This copolyamide provides fiber with higher stiffness.

7 Claims, No Drawings

MELT-PROCESSABLE COPOLYAMIDES HAVING AROMATIC AMIDE UNIT AND FIBERS PREPARED THEREFROM

FIELD OF THE INVENTION

The present invention relates to copolyamides having an aromatic amide unit, which can be melt-polymerized and melt-shaped, and fibers prepared therefrom.

BACKGROUND OF THE INVENTION

Aliphatic polyamides, such as nylon 6 and nylon 66, and aromatic polyamides, such as poly-p-phenylene terephthalamide, are very useful polyamides and are produced on a commercial scale.

The former aliphatic polyamides are generally advantageous with respect to the case of handling and general purpose properties because they can be melt-polymerized and melt-shaped into shaped articles, such as fibers, films and molded articles. Aliphatic polyamides, such as nylon 66, however, have poor dimensional stability, even though they are widely used as tire cord materials in view of their high strength. Thus, it has been desired to improve the aliphatic polyamide so as to provide higher stiffness.

On the other hand, the latter aromatic polyamides, such as poly-p-phenylene terephthalamide and poly (1,4-benzamide), have excellent mechanical properties, such as high stiffness, because they contain an aromatic ring of rigid structure. These aromatic polyamides, however, cannot be melt-polymerized and melt-shaped. This leads to complexity in the method of production thereof and an increase in production costs. Thus, they are seriously inferior in general purpose properties compared to the foregoing aliphatic polyamides.

In addition, aromatic ring-containing polyamides, such as polyhexamethylene terephthalamide (nylon 6T), poly-p-phenylene adipamide (nylon P6) and a polyamide comprising piperazine and terephthalic acid, are known. These aromatic ring-containing polyamides, however, cannot be melt-polymerized and melt-shaped because of their high melting points. Thus, they suffer from the same problems as described for the foregoing aromatic polyamides.

Moreover, as melt-shapable aromatic ring-containing polyamides, polyhexamethylene isophthalamide (Nylon 6I), poly-m-xylylene adipamide (MXD-6), etc., are also known. These polyamides, however, do not have high stiffness.

Even in the case of copolymers which have been proposed to eliminate the foregoing drawbacks, for example, the copolymer as described in British Pat. No. 1,176,346 which is prepared by copolymerizing nylon 66 and nylon 6T, sufficient stiffness can not be obtained. These copolymers, therefore, are not improved to the extent that they are completely satisfactory for practical use.

Furthermore, aliphatic-aromatic polyamides having a high aromatic amide unit content have been proposed (for example, as described in Japanese Pat. No. 6733/1980). These aliphatic-aromatic polyamides, however, cannot be melt-polymerized or melt-shaped because of their high melting points.

SUMMARY OF THE INVENTION

The object of the invention is to provide copolyamides which can be easily produced at low cost, and which are greatly improved in performance, particularly in stiffness while maintaining their good general purpose properties.

The invention, therefore, provides melt-processable copolyamides prepared from diamine and dicarboxylic acid containing from about 1 to 20 mol % of an aromatic amide unit having the formula

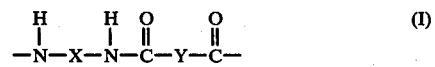

wherein X and Y have chain extending bonds which are essentially coaxial or parallel and oppositely directed and are each selected from a phenylene group, a naphthylene group, a biphenylene group and $-\phi-Z-\phi-$, wherein $\phi$ represents a p-phenylene group and Z represents $-O-$, $-S-$, $-SO_2-$, $-CO-$, $-NH-$, $-CH_2-$, $-(CH_2)_2-$ or $-C(CH_3)_2-$.

DETAILED DESCRIPTION OF THE INVENTION

The copolyamides of the invention can be melt-polymerized and melt-shaped. Copolyamides having the foregoing aromatic amide unit have heretofore been believed to be incapable of being synthesized by melt-polymerization.

A method for producing a copolyamide having a relatively high melting point by copolymerizing a small amount of p-aminobenzoic acid and nylon 66 by a melt-polymerization process has been proposed in U.S. Pat. No. 2,688,011. This copolyamide, however, does not have sufficiently high stiffness.

Heretofore, aromatic polyamides have been synthesized from diamines and dicarboxylic acids by a solution polymerization method and an interfacial polymerization method, and they have been shaped from the solution. on the other hand, the copolyamides of the invention can be converted into the desired shaped article by a melt-polymerization and melt-shaping technique which is simple and provides high productivity. Furthermore, the copolyamides of the invention have sufficiently high stiffness even though they contain only a small amount of the aromatic amide unit.

The polyamide which is used as a base in the invention is a nylon component prepared from a diamine compound wherein an amino group is bound to an aliphatic hydrocarbon group, and a dicarboxylic acid. It is usually used to mean a nylon which is prepared from a nylon salt, e.g., hexamethylenediammonium adipate (nylon 66 salt), hexamethylenediammonium terephthalate (nylon 6T salt), etc.

Examples of diamine compounds which can be used include hexamethylenediamine, ethylenediamine, trimethylenediamine, tetramethylenediamine, pentamethylenediamine, nonamethylenediamine, p-xylylenediamine, bis-p-aminocyclohexylmethane, 1,2-bis-p-aminocyclohexylethane and 2,2-bis-p-aminocyclohexylpropane, and their derivatives.

Examples of dicarboxylic acid compounds which can be used include adipic acid, sebacic acid, succinic acid, glutaric acid, pimelic acid, suberic acid, azelaic acid, undecane dicarboxylic acid, dodecane dicarboxylic acid, and aromatic dicarboxylic acids as described hereinafter, and their derivatives.

The nylons for use as a base (i.e., the main component of the copolyamide) in the invention should preferably be prepared from the foregoing diamines and dicarboxylic acids. Nylons such as nylon 6, which are prepared by polycondensation of ω-amino acids or their lactams, are not preferred for use in the invention, because owing to the chemical equilibrium between the ring and chain, they contain a large amount of monomers which should be removed prior to the practical use thereof.

These base nylons may contain therein a small amount of three or more functional components. Examples include trimellitic acid, pyromellitic acid, melamine, and diethylenetriamine.

Examples of aromatic diamines which can be used to form the aromatic amide unit include p-phenylenediamine, m-phenylenediamine, 2,6-naphthalenediamine, 4,4′-diaminobiphenyl, 4,4′-diaminodiphenyl ether, 4,4′-diaminodiphenylmethane, 4,4′-diaminodiphenylsulfone, 1,2-bis-p-aminophenylethane, and 2,2-bis-p-aminophenylpropane. Examples of aromatic dicarboxylic acids include terephthalic acid, isophthalic acid, 2,6-naphthalenedicarboxylic acid, 4,4′-diphenyldicarboxylic acid, 4,4′-dicarboxy diphenyl ether, 4,4′-dicarboxydiphenylsulfone, 4,4′-dicarboxydiphenylmethane, 1,2-bis-p-carboxyphenylmethane, 2,2-bis-p-carboxyphenylpropane, and 1,2-bis-p-carboxyphenylethane.

Aromatic diamines and aromatic dicarboxylic acids which are derived from the foregoing aromatic diamines and aromatic dicarboxylic acids by substituting one or more hydrogen atoms of the aromatic ring with other substituents can be used in the invention in addition to the foregoing aromatic diamines and aromatic dicarboxylic acids. In order to attain the object of the invention, however, it is preferred that they have no substituents which prevent the packing of the aromatic rings. The most preferred aromatic diamines and aromatic dicarboxylic acid have the aromatic rings having the chain extending linkage in para-positions, such as 1,4-phenylene, and 4,4′-biphenylene.

Furthermore, when it is desired to provide characteristics other than stiffness, for example, to increase the glass transition point, it is preferred that the base polyamide be selected so as to thereby increase the aromatic ring content of the polymer formed.

In preparing the copolyamides of the invention, if the components are able to form a salt, it is convenient to charge them for the polymerization thereof in the form of the salt. Aromatic diamines and dicarboxylic acids are usually added in the form of a mixture or alternatively separately, since corresponding salts are not obtained. However, if the melting points of their initial condensates are about 350° C. or less and the addition of such initial condensates provides uniform copolyamides, they may be added in the form of the initial condensate.

The copolyamides of the invention can be prepared by adding the components forming the aromatic amide unit having formula (I) before the initiation of or in the course of the polymerization of the polyamides forming the base of the copolyamides. In view of the uniformity of the copolyamides formed, it is preferred that the addition of the aromatic amide unit-forming components be performed at a stage when the polymerization has not proceeded very much. In adding such components, water or nylon forming materials may be used as media. The molar ratio of diamine to dicarboxylic acid is adjusted to substantially 1:1 (i.e., about 0.95:1 to about 1.05:1) taking into account the spatter of the feed, etc. in the course of the polymerization.

In preparing the copolyamides of the invention, the aromatic amide unit content of the total copolyamide (hereinafter referred to as "K %") is selected within the range of from about 1 to 20 mol % so as to provide those copolyamides having a melting point of about 350° C. or less which can be melt-shaped. For example, in the case of a copolyamide which is prepared from nylon 66 salt, p-phenylene-diamine and terephthalic acid, it is preferred that the p-phenylene terephthalamide unit constitutes about 15 mol % or less of the total copolyamide. If the aromatic amide unit content is more than about 15 mol %, the copolyamide formed has a high melting point and thus difficulty is encountered in the melt-shaping thereof.

In general, when the melting point of the polyamide forming the base is high, it is necessary to reduce the aromatic amide unit content. When the polyamide forming the base has a low melting point, it is possible to increase the aromatic amide unit content. In any case, however, it is necessary to adjust the K % within the range of about 1 to 20 mol %. In lesser amounts than about 1% the stiffness is insufficiently improved, whereas in greater amounts than about 20 mol % melt-polymerization and melt-shaping become impossible. It is preferred that the melting point of the copolyamide is adjusted to from about 200° C. to 350° C. by appropriately selecting the composition thereof.

The copolyamides of the invention are prepared by a usual melt-polymerization method, e.g., as described in British Pat. No. 506,125. A typical example of such melt-polymerization methods is a method for use in the production of nylon 66. To facilitate the reaction, it is preferred that the pressure-controlling period is performed at as a high temperature and pressure as possible and for as a long time as possible. In order to obtain copolyamides having high degrees of polymerization, it is desired to thoroughly stir the reaction mass under reduced pressure at a later stage of the polymerization.

Usually, a method is employed in which an aromatic diamine and an aromatic dicarboxylic acid are added to a nylon salt which forms a polyamide as a base and the resulting mixture is heat-polymerized along with water. Additionally, a method can be employed in which an aromatic diamine and a lower alkyl ester of an aromatic dicarboxylic acid are added to a nylon salt and, if desired, an alcohol medium is added, and the resulting mixture is melt-polymerized while distilling off the alcohol.

The addition of a hindered phenol-based heat stabilizer in the polymerization provides an increase in the heat resistance of the copolyamide formed, the formation of light colored copolyamides, and the prevention of coloration of the copolyamides during the course of melt-shaping.

Examples of such hindered phenol-based heat stabilizers which can be used include diethyl(4-hydroxy-3,5-di-tert-butylphenylmethyl)phosphonate, diphenyl(4-hydroxy-3,5-di-tert-butylphenylmethyl)phosphonate, dibutyl (4-hydroxy-3,5-di-tert-butylphenylmethyl)phosphonate, and the corresponding phosphites, phosphinates, phosphates, phosphines and phosphinoxides thereof, N,N′-bis 3-(3,5-di-tert-butyl-4-hydroxyphenyl)-propionyl hexamethylenediamine, N,N′-bis 4-(3,5-di-tert-butyl-4-hydroxyphenyl)butylyl hexamethylenediamine bis (4-hydroxy-3,5-di-tert-butylphenylcarboxylethyl sulfite, tetrakis methylene-(3,5-di-tert-butyl-4-hydroxyhydrocinnamate) methane, 2,4-di-tert-butyl-p-cresol, 4-methoxymethyl-2,6-di-tert-butylphenol, 4,6-dimethyl-2-(1-methylcyclohexyl)phenol, 4,4′-dihydroxy-3,3',5,5'-tetra-tert-butylbiphenyl, 1,1,3-tris-(2-methyl-4-hydroxy-5-tert-butylphenyl)butane, etc.

In addition to such hindered phenol-based heat stabilizers, copper salts, phosphoric acid salts, phosphorous acid, 2-mercaptobenzimidazoles, etc. which are generally known as heat stabilizers may be used in combination. Furthermore, for other purposes, other additives, such as a polymerization catalyst, a light stabilizer, a matting agent, a coloring agent, a fluorescent whitener, a flame retardant and an antistatic agent, may be added.

In many cases, the molecular weight of the copolyamide of the invention is limited by the requirements not only for the final product, but also for the production thereof. That is, the upper limit of the molecular weight is determined by the melt viscosity at the melting temperature, and the lower limit is determined so that the copolyamide formed has satisfactory physical properties. In the case of fibers and films for which the stiffness is most required, polymers having relatively low molecular weights are preferred, and in the case of industrial materials for which high strength and stiffness are required, polymers having as high molecular weights as possible are desired.

For the copolyamides of the invention, which are prepared by melt-polymerization, the molecular weight can be controlled over the same wide range as in nylon 66 which is satisfactory for obtaining the desired final product.

Various chemical and physical procedures are known for measuring the molecular weight of the copolyamides of the invention. Of these procedures, the inherent viscosity (JIS K-6810), as determined by measuring the solution viscosity, is most convenient. In this JIS K-6810 method, a solution of 1 g of copolyamide in 100 ml of 98% by weight sulfuric acid is used and the solvent and solution viscosities are determined at 25° C. The inherent viscosity is determined therefrom by the following equation.

$$\text{Inherent Viscosity } (\eta \ inh) = \frac{\ln\left(\frac{\eta}{\eta_o}\right)}{C}$$

C: A concentration of polymer solution
$\eta_o$: A viscosity of solvent
$\eta$: A viscosity of solution In order to attain the objects of the invention, the copolyamides of the invention are required to have inherent viscosities of at least about 0.5, and preferably from 0.6 to 1.8, and more preferably from 0.8 to 1.4. In the case of copolyamides having high viscosities which are to be used in special applications, a solid phase polymerization method in which chips of the copolyamide are first produced, and then heated at a temperature lower than the melting point of the copolyamide in vacuum or in an atmosphere of $N_2$ gas, as well as a method in which the polymerization is performed in high vacuum at a later stage of the melt-polymerization may be employed. The solid phase polymerization method can be employed in the case where chips having a relatively low viscosity are formed (and those chips have the desired inherent viscosity) in order to eliminate various problems which arise with increasing viscosity during the polymerization steps.

The copolyamides of the invention are shaped into fibers, films, plastic molds, etc., having significantly improved stiffness in accordance with a melt-shaping method.

In the examples as described hereinafter, the copolyamides obtained by the melt-polymerization were chipped, dried and then melt-shaped. In the case of the production of products such as fibers and films, after the melt-polymerization in a vacuum polymerization vessel or by the use of a finisher, the copolyamide can be adjusted as it is to a predetermined temperature. In the case of fibers, the copolyamide formed can be directly spun, wound, and thereafter subjected to heat drawing. In accordance with a more convenient method, the copolyamide is spun and subsequently is subjected to predetermined drawing and heat treatments to obtain the final product. Furthermore, in accordance with another convenient method, the copolyamide is spun at a high speed and subsequently is subjected to heat treatment to obtain the final product.

Undrawn yarns which are obtained by melt-spinning are generally drawn so that the residual elongation is about 3 to 30%. The drawing may be performed either by a method in which undrawn yarns are first wound and are then drawn, or by a so-called spin draw process in which subsequent to the spinning step, the drawing treatment is applied for example, the spin draw process is disclosed in British Pat. No. 889,144, etc.

Where the speed of spinning is relatively low and the elongation of undrawn yarns is about 200% or more, the drawing may be performed in two or more stages. However, it is preferred that the speed of spinning of about 1,000 m/min or more is employed so that the elongation of the undrawn yarns is about 200% or less, and the drawing is performed at one stage. In any case, it is preferred to perform the drawing at an draw ratio which is from about 92% to 98% of the maximum draw ratio, and at temperatures lower, by about 100° at 20° C., than the melting point of the copolyamide (in the case of two step drawing, this is done in the second step). Under such conditions that the foregoing requirements are not met, no yarns having good performance can be obtained efficiently.

Subsequent to the drawing, a heat-treatment at a stretching ratio of 0.95/1 to 1.10/1 may be performed to provide yarns having higher dimensional stability. At the spinning and drawing steps, it is preferred to apply an oil agent and intermingle-treatment in order to make easy the handling of yarns, for example, as described in U.S. Pat. No. 2,985,995.

In accordance with the invention, copolyamide yarns having a strength of more than about 8 g/d and an initial Young's modulus of more than about 70 g/d which are suitable for use as industrial materials, can be produced easily and efficiently.

Hereinafter, the aromatic amide unit content (K %) of the copolyamides of the invention will be explained by a typical example.

In producing copolyamides from hexamethylenediamine (H), adipic acid (A), p-phenylenediamine (P) and terephthalic acid (T), four kinds of amide units, HA, HT, PA and PT are formed, and the PT unit content (in mol %) is herein defined as K %.

The following examples are given to illustrate the invention in greater detail. The inherent viscosity used in the specification and examples is a natural logarithm of a relative viscosity of a solution of 1 g of copolyamide in 100 ml of 98% sulfuric acid as measured at 25° C. Also, the melting temperature as used in the examples is generally an about 20° to 40° C. higher temperature than the melting point, at which the copolyamide flows sufficiently. With regard to color tone, the chips were examined and the color tone determined with the naked eye. The strength-retention ratio was determined after exposing the drawn yarns at 160° C. for 1 hour.

In these examples, parts are by weight.

EXAMPLE 1

Nineteen hundred and sixty five (1965) parts of nylon 66 salt, 685 parts of a mixture of p-phenylenediamine (P) and terephthalic acid (T) (molar ratio: 1:1), 10 parts of benzoic acid as a viscosity stabilizer, and 2,000 parts of water were throughly mixed and placed in an autoclave. After throughly purging with nitrogen gas, the mixture was heated to 220° C. and was then subjected to a pre-polymerization at a pressure of 20 Kg/cm² for 4 hours while distilling off the water. The pressure was gradually reduced over a period of one hour and was returned to atmospheric pressure. Thereafter, the temperature was raised to 295° C., and while maintaining the temperature at 295° C., the pressure was reduced to 10 mmHg over a period of one hour. At this reduced pressure, the pre-polymerization mixture was reacted for an additional one hour to obtain a polymer having an inherent viscosity of 1.2 and a melting point of 265° C. (the K % of the polymer was 6.3%). The polymerizability was very good and the polymer thus obtained had a color tone of yellow and a uniform and transparent appearance.

The polymer was chipped, dried at 120° C. for 8 hours in nitrogen gas, melt-spun under the conditions of a melting temperature of 300° C., a speed of spinning of 300 m/min, and using 300 nozzles, by the use of an extruder type melt-spinning machine, and then was drawn at a drawing temperature of 240° C., a drawing speed of 200 m/min, and a draw ratio of 5.0 to provide 1,500 denier/300 filaments yarn. The operating efficiency was very good. The yarn thus obtained had a strength of 8.5 g/d, a break elongation of 9% and a desirably high initial Young's modulus of 110 g/d.

EXAMPLE 2

In the same manner as in Example 1, 2,650 parts of a mixture of nylon 66 salt, nylon 6T salt, P and T was polymerized. The thus obtained polymer was spun and drawn. The mixing ratio of nylon 66/nylon 6T/P and T, the K %, the melting temperature and the initial Young's modulus are tabulated in Table 1 (wherein Nos. 8 and 9 indicate comparative examples).

The temperature at the end of the polymerization was adjusted to a temperature 5° C. to 30° C. lower than the melting temperature at the spinning step. The heat-treatment temperature was adjusted to a 60° to 90° C. lower temperature than the melting temperature. The draw ratio was controlled within the range of 5 to 6 so that the residual elongation was about 10%.

TABLE 1

| No. | Molar Ratio of Nylon 66/ Nylon 6T/P and T | K % (%) | Melting Temperature (°C.) | Initial Young's Modulus (g/d) |
|---|---|---|---|---|
| 1. | 90/0/10 | 1 | 265 | 65 |
| 2. | 80/0/20 | 4 | 285 | 100 |
| 3. | 70/0/30 | 9 | 330 | 125 |
| 4. | 70/20/10 | 3 | 285 | 80 |
| 5. | 50/40/10 | 5 | 310 | 95 |
| 6. | 70/10/20 | 6 | 290 | 105 |
| 7. | 50/30/20 | 10 | 300 | 130 |
| 8. | 80/20/0 | 0 | 290 | 40 |
| 9. | 100/0/0 | 0 | 285 | 40 |

In the same manner as described above, nylon 66 salt, nylon 6T salt and a mixture of equimolar amounts of p-phenylenediamine and adipic acid were polymerized to provide copolyamides having K % of 1, 4 and 9%. From these copolyamides, yarns were produced. For the thus obtained yarns, the same results as for Nos. 1, 2 and 3 were obtained.

EXAMPLE 3

In each experimental run, 3,000 g of nylon 66 salt, nylon 6T salt, and P and T was prepared in the formulation as is shown in Table 2, mixed with 1,500 g of water and placed in an autoclave. After fully replacing the air with nitrogen, they were polymerized under the conditions as shown in Table 2.

For comparison, nylon 66 polymer was produced, and its inherent viscosity η inh is shown in Table 2.

The thus prepared polymer was chipped, dried in an atmosphere of nitrogen at 120° C., melt-spun under the conditions of a spinning speed of 250 m/min and using 30 nozzles at a melting temperature as shown in Table 3 by the use of an extruder type melt-spinning machine (in the case of Nos. 9 and 10, after the solid phase polymerization of dried chips at 220° C. under reduced pressure), taken off with take-off rollers, drawn to 3 times the original length between the take-off roll and a first draw roller maintained at 100° C. and was subjected to a heat drawing by bringing into contact with a 150 cm long hot plate maintained at the temperature as shown in Table 3 between the first draw roller and the second draw roller maintained at 140° C. so that the total draw ratio was 5.5 to thereby obtain 150 denier/30 filaments yarns.

The results are shown in Table 3.

TABLE 2

| No. | Molar ratio of Nylon 66/ Nylon 6T/P and T | Polymerization Conditions | η inh |
|---|---|---|---|
| 1. | 100/0/0 | 210° C. × 1 hr.(13 kg/cm²) → 290° C. × 2 hr.(22 kg/cm² → atmospheric pressure) → 290° C. × 0.5 hr. | 1.06 |
| 2. | 85/15/0 | 210° C. × 1 hr.(13 kg/cm²) → 290° C. × 2 hr.(22 kg/cm² → atmospheric pressure) → 290° C. × 0.5 hr. | 1.13 |
| 3. | 96/0/4 | 210° C. × 1 hr.(13 kg/cm²) → 290° C. × 2 hr.(22 kg/cm² → atmospheric pressure) → 290° C. × 0.5 hr. | 1.03 |
| 4. | 90/0/10 | 210° C. × 1 hr.(13 kg/cm²) → 290° C. × 2 hr.(22 kg/cm² → atmospheric pressure) → 290° C. × 0.5 hr. | 1.03 |
| 5. | 80/10/10 | 210° C. × 1 hr.(13 kg/cm²) → 290° C. × 2 hr.(22 kg/cm² → atmospheric pressure) → | 1.06 |

TABLE 2-continued

| No. | Molar ratio of Nylon 66/ Nylon 6T/P and T | Polymerization Conditions | η inh |
|---|---|---|---|
| 6. | 75/0/25 | 290° C. × 1 hr.(50 kg/cm$^2$) → 290° C. × 0.5 hr.(atmospheric pressure) 210° C. × 1 hr.(13 kg/cm$^2$) → 290° C. × 2 hr.(22 kg/cm$^2$ → atmospheric pressure) → 290° C. × 1 hr.(50 kg/cm$^2$) → 290° C. × 0.5 hr.(atmospheric pressure) | 0.96 |
| 7. | 60/20/20 | 240° C. × 2 hr.(15 kg/cm$^2$) → 310° C. × 2 hr.(30 kg/cm$^2$ → atmospheric pressure) → 310° C. × 2 hr.(10 mmHg) 310° C. × 0.5 hr (atmospheric pressure) | 1.03 |
| 8. | 65/0/35 | 240° C. × 2 hr.(15 kg/cm$^2$) → 330° C. × 2 hr.(36 kg/cm$^2$ → atmospheric pressure) 330° C. × 2 hr (10 mmHg) 330° C. × 0.5 hr (atmospheric pressure) | 0.88 |
| 9. | 40/40/20 | 240° C. × 2 hr.(15 kg/cm$^2$) → 330° C. × 2 hr.(36 kg/cm$^2$ → atmospheric pressure) 330° C. × 2 hr (10 mmHg) 330° C. × 0.5 hr (atmospheric pressure) + solid phase polymerization | 1.02 |
| 10. | 50/40/10 | 240° C. × 2 hr.(15 kg/cm$^2$) → 330° C. × 2 hr.(36 kg/cm$^2$ → atmospheric pressure) 330° C. × 2 hr (10 mmHg) 330° C. × 0.5 hr (atmospheric pressure) + solid phase polymerization | 1.04 |

TABLE 3

| No. | Molar ratio of Nylon 66/ Nylon 6T/P and T | Melting Temp. (°C.) | Temp. of heated plate (°C.) | Initial Young's Modulus (g/d) 20° C. | Initial Young's Modulus (g/d) 100° C. |
|---|---|---|---|---|---|
| 1 | 100/0/0 | 290 | 200 | 40 | 15 |
| 2 | 85/15/0 | 290 | 200 | 45 | 18 |
| 3 | 96/0/4 | 290 | 190 | 40 | 17 |
| 4 | 90/0/10 | 290 | 190 | 65 | 25 |
| 5 | 80/10/10 | 285 | 200 | 80 | 35 |
| 6 | 75/0/25 | 295 | 220 | 110 | 45 |
| 7 | 60/20/20 | 310 | 240 | 120 | 60 |
| 8 | 65/0/35 | 330 | 250 | 130 | 50 |
| 9 | 40/40/20 | 350 | 250 | 120 | 65 |
| 10 | 50/40/10 | 350 | 250 | 130 | 55 |

Nos: 1, 2 and 3: Comparative examples

TABLE 4

| No. | Molar ratio of Nylon 66/ Nylon 6T/P and DMT or P and T | K % | η inh | Melting point (°C.) | Initial Young's Modulus (g/d) |
|---|---|---|---|---|---|
| 1 | 70/20/10 | 3 | 1.06 | 275 | 85 |
| 2 | 70/20/10 | 3 | 1.06 | 269 | 80 |
| 3 | 70/20/10 | 3 | 1.06 | 255 | 73 |
| 4 | 50/40/10 | 5 | 0.96 | 300 | 110 |
| 5 | 50/40/10 | 5 | 0.96 | 275 | 95 |
| 6 | 40/50/10 | 6 | 0.88 | 330 | 120 |
| 7 | 40/50/10 | 6 | 0.96 | 305 | 98 |
| 8 | 65/15/20 | 7 | 1.03 | 283 | 115 |
| 9 | 65/15/20 | 7 | 1.03 | 269 | 100 |
| 10 | 50/30/20 | 10 | 0.88 | 307 | 130 |
| 11 | 50/30/20 | 10 | 0.96 | 282 | 106 |
| 12 | 30/50/20 | 14 | 0.96 | 315 | 110 |

EXAMPLE 4

In each of experiment Nos. 3, 5, 7, 9, 11 and 12, nylon 66 salt, nylon 6T salt and a mixture (P and DMT) of p-phenylenediamine (P) and dimethyl terephthalate (DMT) in a molar ratio of 1:1 were mixed in the formulation as shown in Table 4 and polymerized while distilling off the methanol formed. The thus-obtained polymer was chipped.

In experiment Nos. 1, 4, 6, 8 and 10, the above procedure was repeated except that terephthalic acid (T) was used in place of DMT. The thus-obtained polymer was chipped. In experiment No. 2, the procedure of experiment No. 3 was repeated except that a DMT/T mixture (molar ratio: 1:1) was used in place of DMT.

Each of the thus-obtained polymers was melt-spun at a melting temperature (i.e., the melting point+30° C.) as shown in Table 4 under the conditions of a spinning speed of 300 m/min and using 30 nozzles by the use of an extruder type melt-spinning machine, with a first roller which had not been heated, drawn at a draw ratio of the maximum draw ratio ×0.97 while bringing into contact with a heater plate (150 cm long; temperature; the melting point−50° C.) between the first roller and a second roller (180° C.), and then wound to obtain 150 denier/30 filaments yarns.

The results are shown in Table 4.

EXAMPLE 5

To 1,528 parts of nylon 66 salt and 685 parts of P and T there was added N,N'-bis 3-(3,5-di-tert-butyl-4-hydroxyphenyl)propionyl hexamethylenediamine in the amount shown in Table 5. Additionally, 10 parts of benzoic acid as a viscosity stabilizer and 2,000 parts of water were added thereto. The resulting mixture was fully mixed and placed in an autoclave. After throughly replacing the air with nitrogen, the mixture was heated to 220° C. and was subjected to pre-polymerization at a pressure of 20 Kg/cm$^2$ for 4 hours while distilling off the water. Subsequently the pressure was gradually reduced over a period of 1 hour and returned to atmospheric pressure. Then, the temperature was raised to 320° C. While maintaining the temperature at that temperature, the pressure was reduced to 10 mmHg over a period of 1 hour. Under this reduced pressure, the polymerization was conducted for 1 hour to obtain a polymer.

The thus-obtained polymer was chipped, dried at a temperature of 120° C. in an atmosphere of nitrogen, melt spun under the conditions of a melting temperature of 320° C., a spinning speed of 300 m/min, and using 100 nozzles, by the use of an extruder type melt-spinning machine, and was drawn at a drawing temperature of 240° C., a drawing speed of 200 m/min, and a draw ratio of 5.0:1, to thereby obtain 600 denier/100 filaments yarns. The results are shown in Table 5.

TABLE 5

| No. | Amount (% by weight) | η inh | Color Tone | Young's Modulus (g/d) | Strength Retention Ratio (%) |
|---|---|---|---|---|---|
| 1 | 0 | 1.06 | Yellow | 120 | 70 |
| 2 | 0.01 | 1.06 | Pale yellow to yellow | 124 | 81 |
| 3 | 0.5 | 1.06 | Pale yellow | 124 | 90 |
| 4 | 2 | 1.06 | Pale yellow | 118 | 92 |
| 5 | 5 | 1.00 | Pale yellow | 100 | 91 |

It can be seen from Table 5 that the copolyamide containing 0.01 to 5% by weight of the hindered phenol based heat stabilizer is excellent in color tone and yarn performance.

EXAMPLE 6

A copolyamide having a melting point of 263° C. and η inh of 0.96 was prepared from nylon 66 salt (67 mol %), and a mixture of equimolar amounts of p-phenylenediamine (P) and (terephthalic acid) (T)+i-sophthalic acid (I) (T/I=90/10)) (33 mol %).

The thus-obtained copolyamide was chipped, spun at 295° C. through spinneret having 30 orifices each having a diameter of 0.5 mm by the use of an extruder type melt-spinning machine, was subjected to cooling for solidification and oiling, and thereafter undrawn multi-filament yarns having various filament denier were wound at the spinning speed shown in Table 6.

These yarns were fed to a drawing machine wherein they were drawn at a draw ratio of 1.01 between the feed roller and the first draw roller (80° C.) and then heat-drawn at the draw ratio (maximum draw ratio×0.95) shown in Table 6 while bringing into contact with a 50 cm long heater plate maintained at the drawing temperature shown in Table 6 between the first draw roller and the second draw roller (140° C.).

For comparison, nylon 66 having a melting point of 265° C. and η inh of 1.03 was spun and drawn in the same manner as described above.

The strength and initial Young's modulus of the thus-obtained drawn yarns are shown in Table 6.

EXAMPLE 7

In the same manner as in Example 1, 2,650 parts of the total of nylon 66 salt, nylon 610 salt, nylon 6I salt and P and T was polymerized, and the thus-obtained polymer was spun and drawn. The ratio of nylon 66/nylon 610/nylon 6I/P and T, the K %, the melting temperature and the initial Young's modulus are shown in Table 7. The pre-polymerization was performed at 200° C. in the case of the nylons 66, 610 and 66-6I, and at 240° C. in the case of the other polyamides, and the other conditions were the same as in the example I.

TABLE 7

| No. | Molar Ratio 66 | 610 | 6I | P and T | K % (%) | Melting Temperature (°C.) | Initial Young's Modulus (g/d) |
|---|---|---|---|---|---|---|---|
| 1 | 100 | 0 | 0 | 0 | 0 | 285 | 40 |
| 2 | 85 | 0 | 15 | 0 | 0 | 275 | 45 |
| 3 | 70 | 0 | 5 | 25 | 7.5 | 285 | 80 |
| 4 | 55 | 0 | 10 | 35 | 15.75 | 320 | 95 |
| 5 | 50 | 0 | 15 | 35 | 17.5 | 300 | 64 |
| 6 | 0 | 100 | 0 | 0 | 0 | 260 | 28 |
| 7 | 0 | 95 | 0 | 25 | 6.25 | 280 | 47 |
| 8 | 60 | 5 | 0 | 35 | 12.25 | 330 | 100 |
| 9 | 56 | 9 | 0 | 35 | 12.25 | 320 | 80 |
| 10 | 50 | 15 | 0 | 35 | 12.25 | 300 | 62 |

EXAMPLE 8

A series of copolyamides were prepared from the components shown in Table 8 in the same manner as described in Example 1 and dried at 120° C. These copolyamides were each shaped into an about 0.5 mm thick sheet in an atmosphere of nitrogen by the use of a press at the melting temperature shown in Table 8. From the thus-formed sheet, a dumbbell specimen was formed. For the dumbbell specimen, the breaking strength and Young's modulus were measured, and the results are shown in Table 8. For these measurements, the tensile strength test was performed at a temperature of 20° C., a relative humidity of 65%, and a stretching speed of 50%/min.

The symbols used in Table 8 are as follows:
P: p-phenylenediamine
C: 4,4'-diaminodiphenylmethane
O: 4,4'-diaminodiphenyl ether
S: 4,4'-diaminodiphenylsulfone
PX: p-xylylenediamine
T: terephthalic acid
D: 4,4'-diphenyldicarboxylic acid
A: adipic acid

TABLE 6

| No. | Polymer | Spinning Speed (m/min) | Filament Denier of Undrawn Yarn (denier) | Draw Ratio | Drawing Temperature (°C.) | Filament Denier of Drawn Yarn (denier) | Strength (g/d) | Initial Young's Modulus (g/d) |
|---|---|---|---|---|---|---|---|---|
| 1 | Nylon 66 | 400 | 33 | 5.60 | 200 | 6.0 | 9.0 | 45 |
| 2 | " | 1000 | 25 | 4.20 | " | 6.0 | 8.8 | 40 |
| 3 | " | 2000 | 13 | 2.19 | " | 6.0 | 7.8 | 35 |
| 4 | Copolyamide | 400 | 31 | 5.10 | 200 | 6.0 | 8.3 | 67 |
| 5 | " | 1000 | 23 | 3.88 | 200 | 6.0 | 8.5 | 73 |
| 6 | " | 1500 | 8.0 | 2.60 | 200 | 3.1 | 9.0 | 93 |
| 7 | " | 2000 | 10 | 1.74 | 200 | 6.0 | 8.8 | 85 |
| 8 | " | 2000 | 6.5 | 1.70 | 200 | 4.0 | 9.0 | 95 |

I: isophthalic acid

The values in the column of "nylon salt" indicate the number of carbon atoms contained in aliphatic diamines and dicarboxylic acids.

TABLE 8

| No. | Nylon Salt | % | Aromatic Dicarboxylic Acid | % | K % | η inh | Melt-shaping Temperature (°C.) | Young's Modulus | Strength |
|---|---|---|---|---|---|---|---|---|---|
| 1 | 46 | 100 | P/T | 0 | 0 | 1.03 | 315 | 54 | 8.0 |
| 2 | " | 90 | " | 10 | 1 | 1.02 | 320 | 73 | 8.5 |
| 3 | " | 80 | " | 20 | 4 | 1.02 | 340 | 102 | 9.0 |
| 4 | 86 | 100 | P/T | 0 | 0 | 1.13 | 280 | 31 | 6.6 |
| 5 | " | 80 | " | 20 | 4 | 1.10 | 260 | 52 | 7.5 |
| 6 | " | 65 | " | 35 | 12.25 | 1.08 | 310 | 79 | 8.3 |
| 7 | 96 | 100 | P/T | 0 | 0 | 1.06 | 270 | 26 | 6.4 |
| 8 | " | 80 | " | 20 | 4 | 1.06 | 260 | 54 | 7.3 |
| 9 | " | 60 | " | 40 | 16 | 1.02 | 320 | 78 | 8.4 |
| 10 | " | 70 | C/T | 30 | 9 | 1.03 | 300 | 59 | 7.6 |
| 11 | " | 70 | O/T | 30 | 9 | 1.03 | 300 | 54 | 7.4 |
| 12 | " | 70 | S/T | 30 | 9 | 1.00 | 290 | 68 | 6.9 |
| 13 | 410 | 100 | P/D | 0 | 0 | 1.10 | 285 | 28 | 6.5 |
| 14 | " | 85 | " | 15 | 2.25 | 1.10 | 290 | 35 | 6.8 |
| 15 | 410 | 70 | P/D | 30 | 9 | 1.08 | 310 | 56 | 8.2 |
| 16 | 910 | 100 | — | 0 | 0 | 1.09 | 240 | 22 | 6.2 |
| 17 | " | 70 | C/D | 44 | 19.4 | 1.10 | 340 | 68 | 7.4 |
| 18 | " | 70 | O/D | 44 | 19.4 | 1.08 | 340 | 62 | 7.4 |
| 19 | " | 70 | S/D | 44 | 19.4 | 1.05 | 320 | 73 | 6.7 |
| 20 | 66 | 100 | 0 | 0 | 4 | 1.13 | 285 | 38 | 7.5 |
| 21 | " | 70 | PX/T | 30 | 9 | 1.13 | 295 | 39 | 7.4 |
| 22 | " | 60 | " | 40 | 16 | 1.13 | 315 | 42 | 7.2 |
| 23 | 10T | 100 | — | | 0 | 1.10 | 300 | 32 | 7.0 |
| 24 | " | 90 | P/T | 10 | 10 | 1.10 | 295 | 54 | 7.2 |
| 25 | " | 80 | " | 20 | 20 | 1.10 | 330 | 68 | 7.2 |
| 26 | 4I | 100 | — | | | 1.02 | 280 | 28 | 4.6 |
| 27 | " | 90 | P/A | 10 | 9 | 1.02 | 270 | 36 | 4.8 |
| 28 | " | 80 | " | 20 | 16 | 1.02 | 280 | 52 | 5.0 |

Nos. 1, 4, 7, 13, 16, 20, 21, 22, 23 and 26: Comparative examples

While the invention has been described in detail and with reference to specific embodiments thereof, it will be apparent to one skilled in the art that various changes and modifications can be made therein without departing from, the spirit and scope thereof.

What is claimed is:

1. A melt-processable copolyamide prepared from diamines and dicarboxylic acids by a melt-polymerization process, wherein said copolyamide contains from about 1 to 20 mol % of an aromatic amide unit having the formula

wherein X and Y have chain extending bonds which are essentially coaxial or parallel and oppositely directed and are each selected from the group consisting of a phenylene group, a naphthylene group, a biphenylene group, and —φ—Z—φ—, wherein φ represents a p-phenylene group and Z represents —O—, —S—, —SO₂—, —CO—, —NH—, —CH₂—, —(CH₂)₂—, or —C(CH₃)₂—, and
said copolyamide has an inherent viscosity, which is measured in a solution of 1 g of said copolyamide in 100 ml of 98% by weight sulfuric acid at 25° C., of at least about 0.5.

2. A melt-processable copolyamide as in claim 1 wherein X and Y are both p-phenylene groups.

3. A melt-processable copolyamide as in claim 1 wherein the inherent viscosity is from 0.6 to 1.8.

4. A melt-processable copolyamide prepared from hexamethylenediamine, adipic acid, p-phenylenediamine and terephthalic acid wherein p-phenylene terephthalamide unit is contained therein in an amount of from 1 to 15 mol %.

5. A fiber comprising a copolyamide as in claim 1.

6. A fiber comprising said copolyamide as in claim 4.

7. A melt-processable copolyamide as in claim 1, wherein the copolyamide is formed from a diamine selected from the group consisting of hexamethylenediamine, ethylenediamine, trimethylenediamine, tetramethylenediamine, pentamethylenediamine, nonamethylenediamine, p-xylylenediamine, bis-p-aminocyclohexylmethane, 1,2-bis-p-aminocyclohexylethane, 2,2-bis-p-aminocyclohexylpropane, and polyamide forming derivatives thereof, and a dicarboxylic acid selected from the group consisting of adipic acid, sebacic acid, succinic acid, glutaric acid, pimelic acid, suberic acid, azelaic acid, undecane dicarboxylic acid, dodecane dicarboxylic acid, aromatic dicarboxylic acids, and polyamide forming derivatives thereof.

* * * * *